United States Patent
Karlberg

(10) Patent No.: US 7,413,253 B2
(45) Date of Patent: Aug. 19, 2008

(54) HEAD REST FOR MOTOR VEHICLES

(75) Inventor: Rune Karlberg, Bottnaryd (SE)

(73) Assignee: Kongsberg Automotive AB (SE)

( * ) Notice: Subject to any disclaimer, the term of this patent is extended or adjusted under 35 U.S.C. 154(b) by 456 days.

(21) Appl. No.: 10/500,755

(22) PCT Filed: Jan. 2, 2003

(86) PCT No.: PCT/SE03/00002

§ 371 (c)(1),
(2), (4) Date: Mar. 25, 2005

(87) PCT Pub. No.: WO03/057526

PCT Pub. Date: Jul. 17, 2003

(65) Prior Publication Data

US 2006/0012233 A1    Jan. 19, 2006

(30) Foreign Application Priority Data

Jan. 7, 2002    (SE) .................................... 0200044

(51) Int. Cl.
*A47C 1/10* (2006.01)
(52) U.S. Cl. .................. 297/408; 297/391; 297/403; 297/409
(58) Field of Classification Search .......... 297/408, 297/391, 403, 409
See application file for complete search history.

(56) References Cited

U.S. PATENT DOCUMENTS 3,065,029 A * 11/1962 Spound et al. ............... 297/391
3,888,540 A * 6/1975 Protze et al. ................. 297/486
5,054,856 A * 10/1991 Wang .......................... 297/408

FOREIGN PATENT DOCUMENTS

| DE | 199 14 442 A1 | | 10/2000 |
|---|---|---|---|
| EP | 0152867 | * | 8/1985 |
| WO | WO-94/01302 A1 | | 1/1994 |

* cited by examiner

*Primary Examiner*—Laurie K Cranmer
(74) *Attorney, Agent, or Firm*—Lerner, David, Littenberg, Krumholz & Mentlik, LLP

(57) ABSTRACT

The present invention relates to a head rest for a vehicle seat in a motor vehicle. The head rest consists of an attachment (8) arranged on top of the back rest of the vehicle seat, a protective cushion (4) and one or several supporting arms (5, 13) which protrude from the attachment and support the protective cushion (4). The supporting arms are at their one end (7) pivotably attached to the attachment about a lower pivoting shaft (9), and the attachment exhibits a locking mechanism which in its use position for the head rest holds the locking arms pivotable locked about the first pivot shaft relative to the attachment. A release mechanism can, when activated, release the locking mechanism for pivoting of the supporting arms together with the protective cushion about the pivot shaft. The protective cushion (4) is also pivotable attached to the supporting arms (5, 13) about an upper pivoting shaft (10) and a second locking mechanism in the use position holds the protective cushion pivotable locked about the upper pivoting shaft relative to the supporting arm. A further release mechanism can, when activated, release the protective cushion from its pivotably locked position for pivoting of the cushion relative to the supporting arms.

4 Claims, 4 Drawing Sheets

HEAD REST FOR MOTOR VEHICLES

TECHNICAL FIELD

The following invention relates to a head rest for motor vehicles, according to the preamble of appended claim 1.

TECHNICAL BACKGROUND

Head rests for vehicle seats in motor vehicles are primarily intended to protect those travelling in the vehicle, particularly when being hit from behind. Rear vehicle seats, but also front seats, are often foldable in order to make the cargo space of the vehicle flexible. In order to achieve this, the back rest is foldable towards the seat so that it will not come into conflict with surfaces in front or below in the vehicle, for example seats in front. It is previously known to adjust the neck rest to a position to a position which needs less space by means of a link system which, when folding the back rest pulls the head rest towards the upper edge of the back rest, see WO 94/01302. This solution, however, obtains a more limited decreasing of the space when folded. Also, for other purposes such as the view rearwards, there can be reasons for temporarily adjusting the head rest.

SUMMARY OF THE INVENTION

The purpose of the present invention is to obtain a head rest which can be reset to a highly space-saving position, alternatively to temporarily improve the view backwards.

Said purpose is obtained by means of a head rest according to the present invention, the characteristics of which will become evident from appended claim 1.

BRIEF DESCRIPTION OF THE FIGURES

The invention will in the following be described in more detail by means of an example of an embodiment with reference to the appended drawings in which.

A PREFERRED EMBODIMENT

Since all of the views show the head rest in one and the same embodiment, reference will be made in the description more or less to all the figures if nothing else is particularly pointed out.

Figure 1:
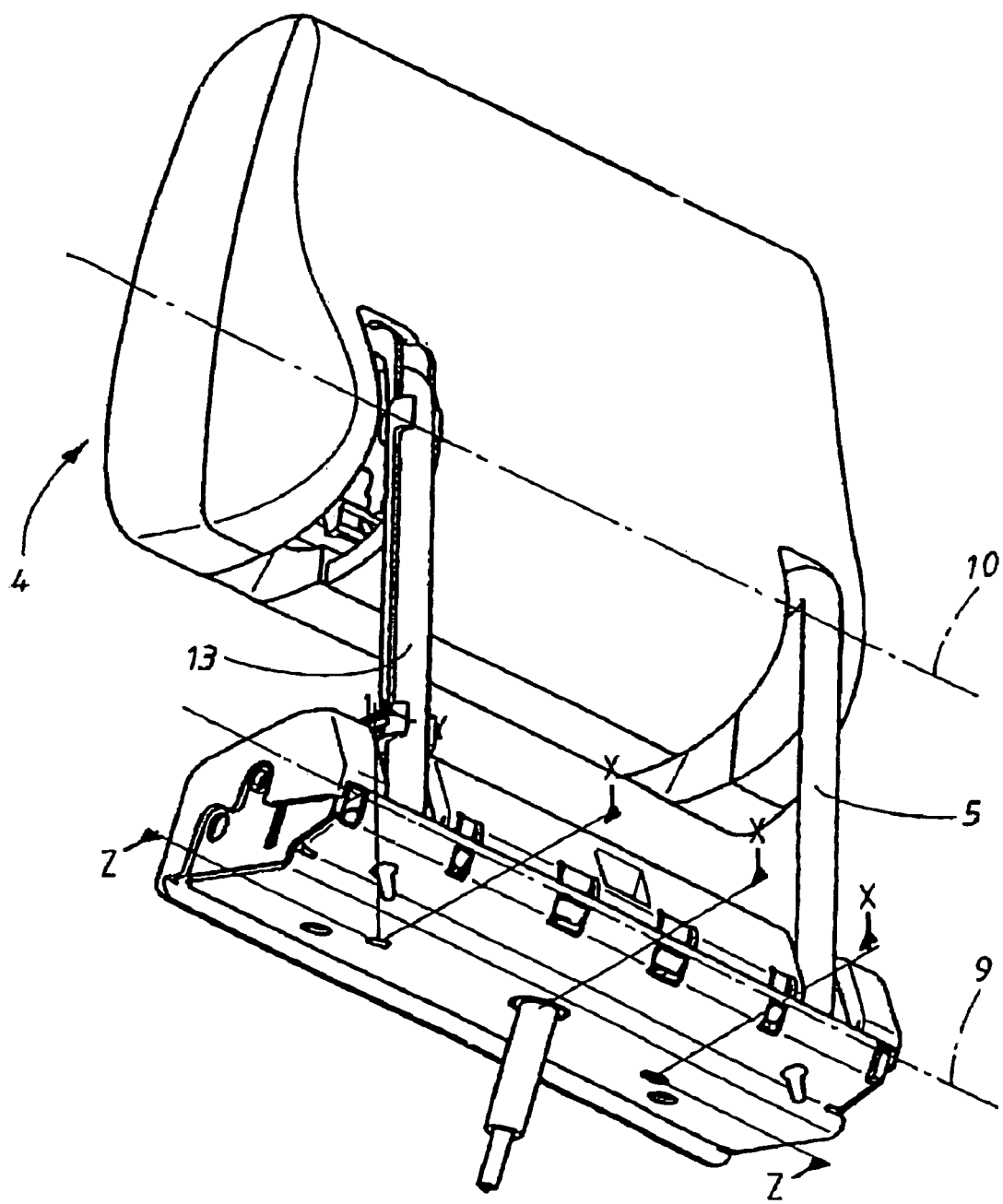
FIG. 1 in a perspective view shows a head rest according to the invention.
Figure 2:
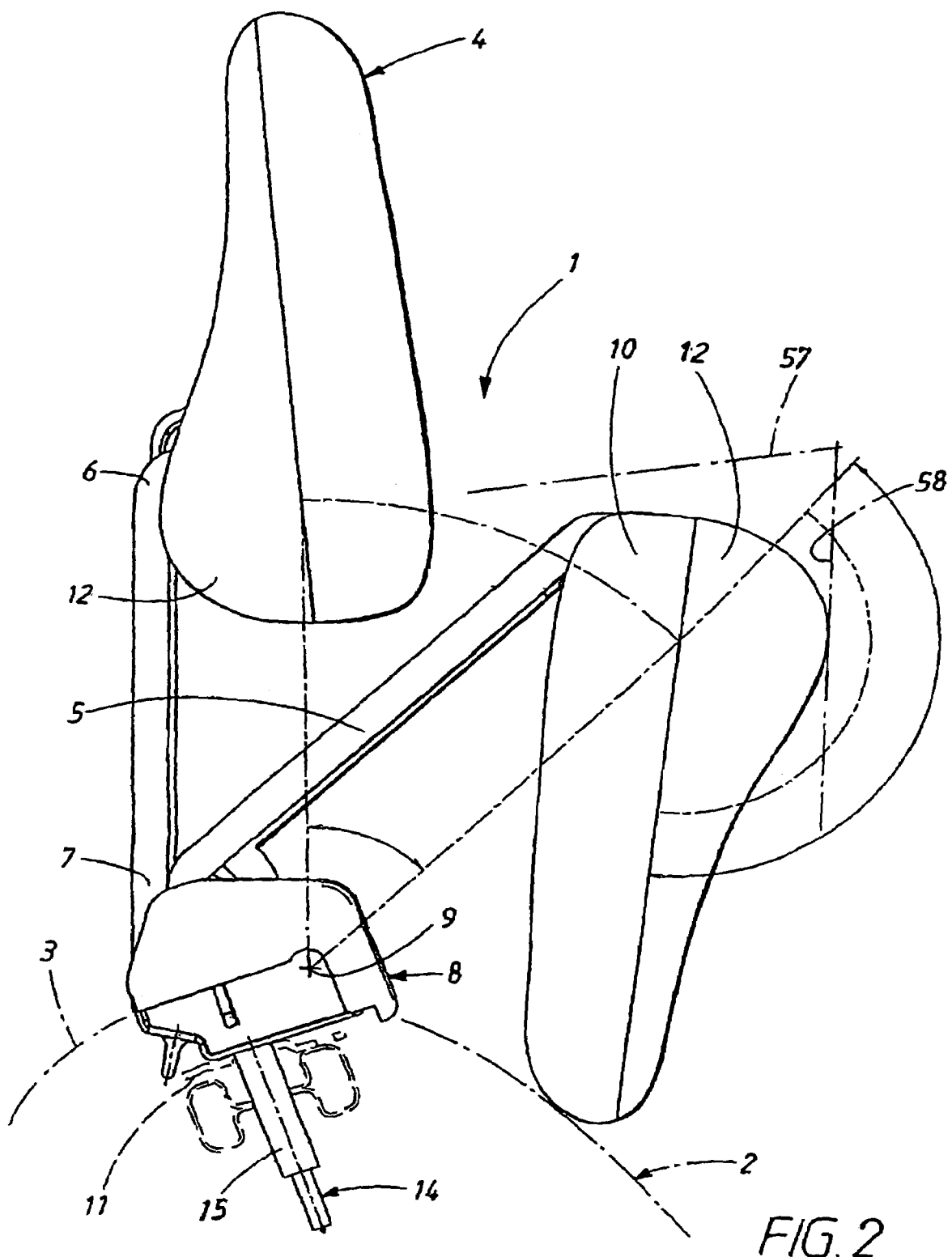
FIG. 2 shows the head rest from the side both in a position for use and a position where it has been moved away.
Figure 3:
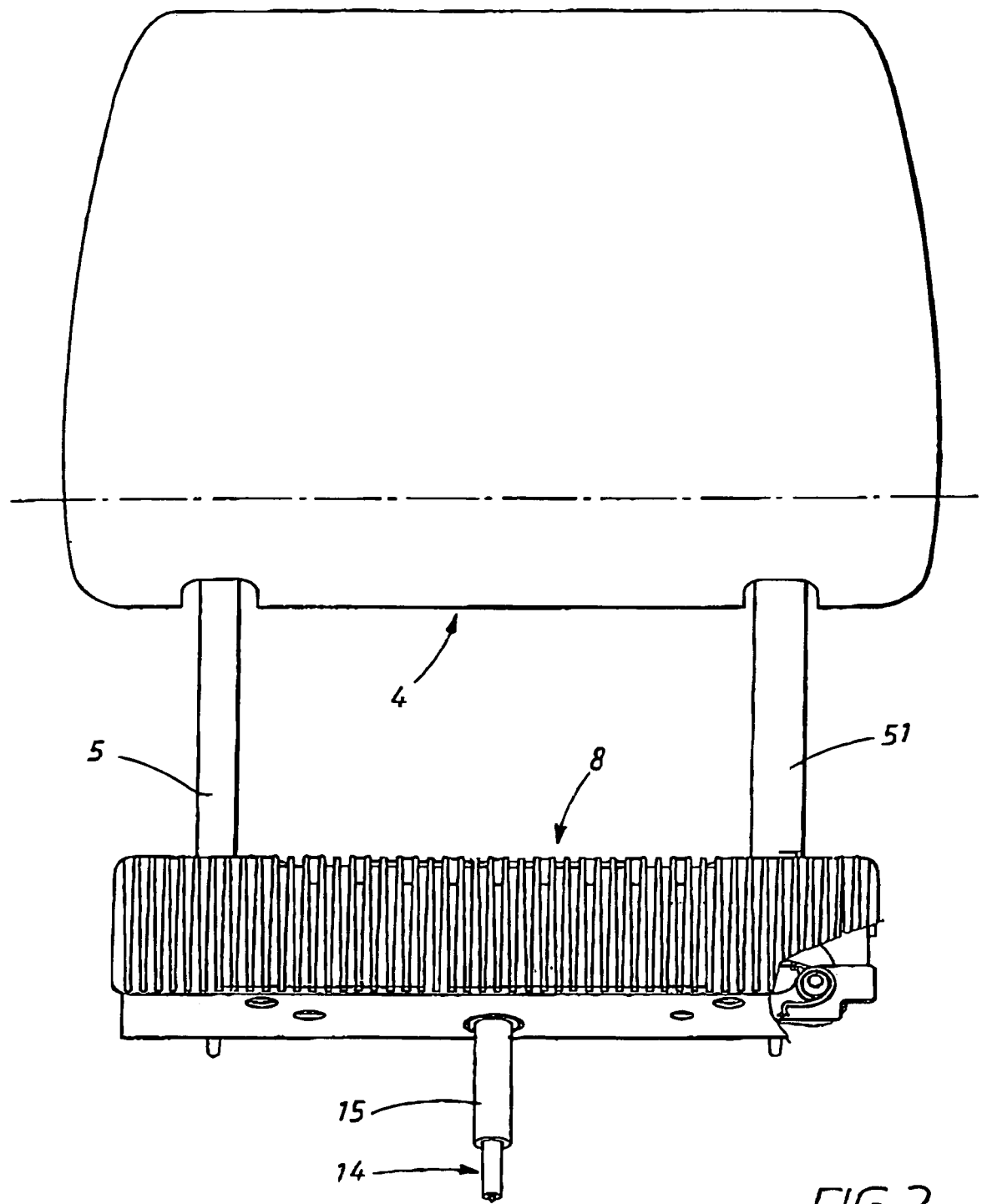
FIG. 3 shows a front view of the head rest.

The head rest 1 according to the invention is comprised in part of a vehicle seat, whose upper edge portion 3 of a back rest 2 is hinted at with dotted lines in FIG. 2. The head rest essentially consists of an upholstered cushion 4 for protecting the back of the head, which is supported by at least one, in the example shown two, supporting arms 5 at the upper end 6 of which the cushion is arranged, and which at their lower end 7 are arranged in a head rest attachment 8 which is attached to the upper portion 3 of the back rest 2, and fixedly attached to the body of the back rest part of which is hinted at.

In order to enable adjustment of the head rest 1 between an upright use position which is shown in all the figures, and a collapsed position moved away, the head rest is pivotable around two pivot points or pivot shafts 9, 10. One of the pivot shafts 9 forms the attachment of the supporting arms 5 at its lower end 7 in the head rest attachment 8, while the other pivot arm 10 forms the attachment of the head rest cushion 4 to the supporting arms in their upper end 6. A further condition is that the upper attachment is positioned at the lower end of the protective cushion 4, i.e. in the lower portion 12 of the cushion.

FIG. 2 shows the head rest according to the invention in both of its main positions or end positions, first the use position with upright supporting arms 5, 13 and upright protective cushion 4, and also in the position with collapsed supporting arms and collapsed protected cushion 4. In more detail, in the example shown the supporting arms 5, 13 are in the use position essentially directed vertically, but this can vary to a high degree according to the vehicle model in question, while the supporting arms in the collapsed position have performed a change of angle in the interval 45-60° about the lower pivot shaft 9. An adjustment angle in the order of size of up to 90° is possible according to the desired position of the neck rest in the position where it is moved away. The adjustment movement about the upper pivot arm 10 can be in the order of size of 145°, and can in extreme cases be up to essentially 180°.

The activation of the adjustment movement of the protective cushion about the first lower shaft 9 can be done in a manner which as such is known, and is preferably activated automatically by means of the back rest 2 being moved forwards. This can, for example, be done by means of a link arm mechanism which is attached at a distance from the pivot shaft of the back rest, or as in the shown example, a manoeuvring wire 14 which runs in a casing 15 and which is attached at the lower end, for example, at a fixed arm relative to the pivot axis of the back rest so that a collapsing movement of the back rests will cause a manoeuvring movement, i.e. a longitudinal displacement movement, in the example shown a towing movement of the manoeuvring wire.

According to the invention, the head rest in its use position is rigidly attached, i.e. non-rotateably attached to its fastenings at the pivot axis 9, 10 respectively. This is achieved by means of a lower locking mechanism 20 and release mechanism 16 in the protective cushion attachment 8 for adjustment between a position locked against pivoting for the arms 5, 13 and a releasing pivoting position for the arms, and also by means of an upper locking mechanism 34 and a release mechanism 17 at the upper pivot shaft 10 adjusted between a pivotally locked position for the cushion 4 and a collapsing position for the cushion. In the example shown, the release mechanism 16 at the protective cushion attachment 8 is arranged to be activated from a locking position to a releasing position by means of the collapsing movement of the back rest 2, while the other release mechanism 17 is arranged to be released from a locking position to a releasing position for the collapsing movement of the protective cushion by means of the collapsing movement of the supporting arms 13, and conversely. The release mechanism 16, 17 have spring mechanisms 18, 19 at their respective pivot shafts 9, 10 in order to create a torque in the collapsing direction to ensure the collapsing movements. The opposite movement for raising of the supporting arms is in the example shown done manually, however with the raising of the supporting arms causing an active adjustment of the head rest to the use position which will be described in more detail below.

Figure 4:
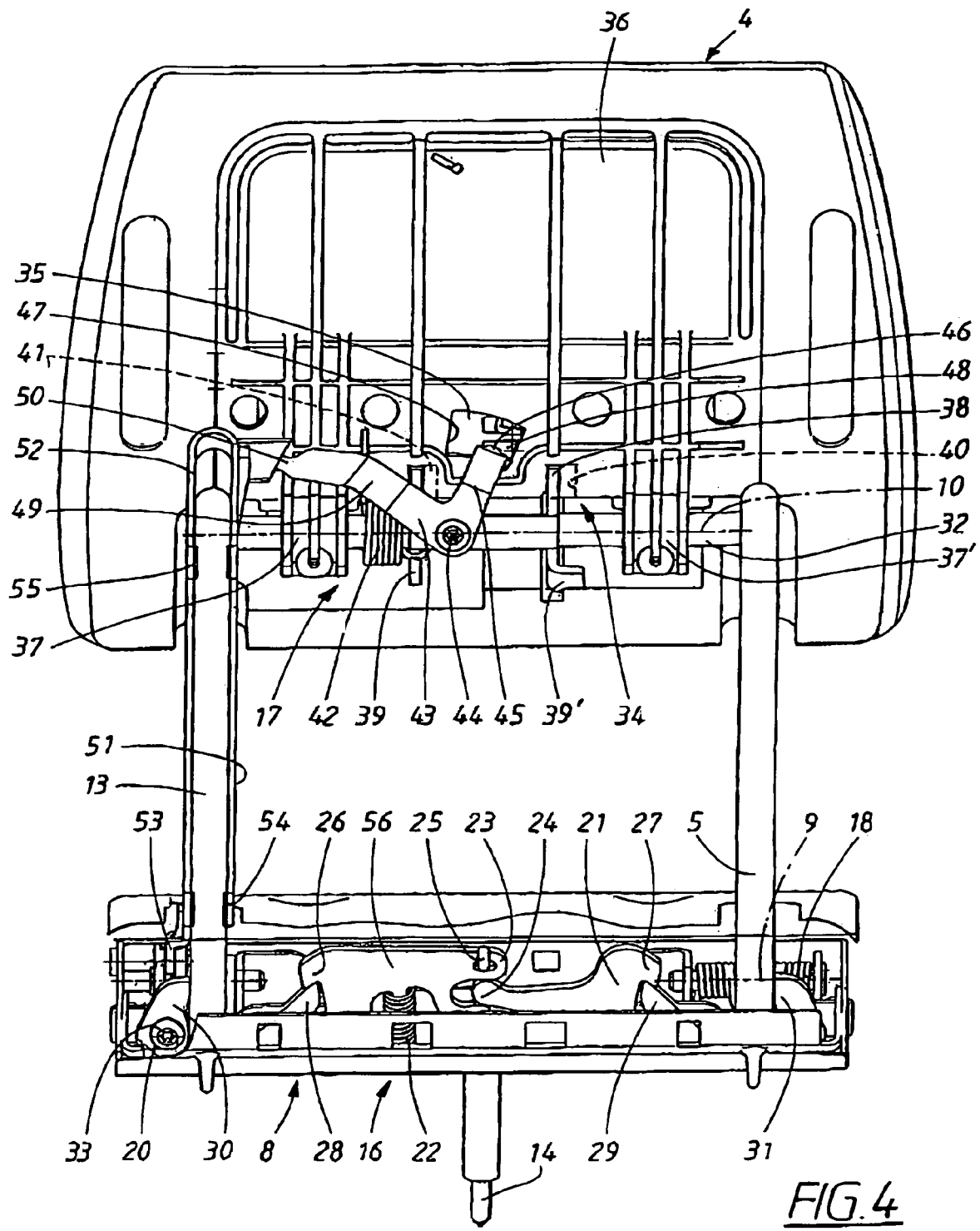
FIG. 4 shows a partially exploded view from which the comprised adjustment mechanisms can be seen.

The lower locking mechanism 20 and the release mechanism 16 and the upper locking mechanism 34 and the release mechanism 17 have a construction which can best be seen in FIG. 4. The lower locking mechanism 16 is thus arranged in the protective cushion attachment 8, which is designed as a cassette or a housing which houses the mechanism in question and interacts with the lower locking mechanism 20, which by means of a not shown coil strives to assume a locking position in which the supporting arms 5, 13 are non-pivotally locked in the upright position, i.e. in the use position of the head rest. The lower locking mechanism is thus arranged to be released by the lower release mechanism 16 when collapsing the back rest, i.e. manoeuvring by means of the manoeuvring mechanism, i.e. the manoeuvring wire 14. The release mechanism 16 in the attachment 8 consists in the example shown of two release latches in the form of two rocker arms 56, 21 which by means of a pressure coil 22 are arranged to rock since they are attached to each other in the one end 23, 24 and one of them at the same end is attached to the end 25 of the manoeuvre wire 14. At their opposite ends, they exhibit a locking hook 26, 27 each which in the locked position catches a corresponding locking hook 28, 29 on the locking mechanism. The locking hooks 28, 29 of the locking mechanisms interact with one locking latch 30, 31 each, which in the upright position of the back rest and the use position of the head rest each block one of the supporting arms 5, 13. As is evident from the figure, the two supporting arms form a common yoke since they are united by means of a cross bar 32 which extends through the protective cushion 4 and also forms the upper pivot shaft 10, i.e. the pivot shaft of the cushion.

In the initial position and the use position, the supporting arms 5, 13 are thus pivotally locked in an upright position relative to their attachment 8 and the protective cushion 4 in an upright pivoting position relative to its pivoting shaft 10, i.e. relative to the supporting arms 5, 13. The non-pivotal position of the protective cushion 4 is kept locked by means of the second locking mechanism 34 in the protective cushion. Its active part consists of a locking element 35 which acts against a not shown coil, and is thus movable sideways in a holder 36 which also forms the body of the protective cushion 4. The holder 36 exhibits fastening portions 37, 37' which form bearing casings by means of which the protective cushion is pivotably arranged about the pivot axis 10, i.e. the cross bar 32. The holder 36 has double walls, and exhibits a cavity at which the locking element 35 is movable. The locking element penetrates in the locking position, i.e. the position shown in FIG. 4, into recesses 38 positioned in a chosen angle position about the shaft 10 in two fixed segments 39, 39', while the locking element itself exhibits recesses 40, 41 which in a covering release position are positioned immediately in front of the segments 38, 39, thus releasing the protective cushion to be adjusted to the position where it is moved away. This adjustment movement is done by means of a twisting coil 42 which is arranged around the cross bar 32. The locking element exhibits an edge portion which crosses the perimeter of the segments. The locking element in the axial position extends relative to the shaft 10, while the segments extend in a radial plane.

The release mechanism 17 in the protective cushion 4 consists of a releasing arm 43 which is pivotably arranged about a pivot shaft 44 arranged crosswise relative to the locking element 35. The release arm 43 is a double-armed lever, the one arm 45 of which exhibits an abutment 46 which penetrates through a hole 47 in the holder 36 and penetrates into a hole 48 in the locking element 35 in order to interact with the edges of the hole. In so doing the release arm 43 can through its pivotal movement bring about the linear adjustment movement sideways of the locking element 35. The locking element is simply guided by the opposing straight inwards facing edge portions of the holder 36. The second arm 49 of the release arm 43 is arranged to, with its outer end 50, follow in the linear movements of a manoeuvring bar 51. It thus extends with its upper end 52 into the protective cushion, and with its lower end into the protective cushion attachment 8 and is arranged to be attached in the protective cushion attachment so that the pivotal movements of the supporting arms 5, 13 bring about a back and forth going manoeuvre movement of the manoeuvring bar 51. In the example shown, the manoeuvre bar at its lower end 53 is pivotably attached to the protective cushion attachment at a distance from the lower pivot shaft 9, by means of which the pivotal movements around the lower pivot shaft bring about the displacement movement which has been described. In the example shown, the manoeuvring bar 51 consists of portions which attach around the one supporting arm 13 and holding yokes 54, 55, so that the supporting arm 13 forms a guide for the manoeuvring bar 51.

When a back rest 3 in the motor vehicle thus, for example by means of a rear back rest, is collapsed forwards and downwards there is a towing in the manoeuvre wire 14, by means of which the release mechanism 16 in the protective cushion attachment is activated and the pivot locking position of the locking mechanism 20 of the protective cushion attachment 8 is released. This causes the supporting arms 5, 13 of the head rest to pivot forwards with the protective cushion under the influence of the adjustment coil 18, which in turn initiates the release of the locking of the head rest in its use position via the manoeuvring bar 51. The protective cushion is here pivoted about its shaft 10 under the influence of the adjustment coil 42, with the head rest assuming the downwards inwards collapsed position against the surface of the back rest as shown in FIG. 2. By means of this, the neck rest is given room in the space available behind a rear edge 57 of the back rest in front or another surface 58 in the vehicle, for example an upwards facing surface such as hinted at with dotted lines in FIG. 2.

The invention claimed is:

1. A head rest for a vehicle seat including a backrest in a motor vehicle comprising:
    an attachment positioned at the top of said backrest;
    a cushion;
    at least one supporting arm protruding from said attachment and supporting said cushion;
    wherein said at least one supporting arm is pivotably attached to said attachment and pivots around a first pivoting axis, said attachment further including a first locking mechanism configured to hold said at least one supporting arm in a locked position relative to said attachment, and a first release mechanism configured to release said first locking mechanism, thereby allowing pivoting of said at least one supporting arm, together with said cushion, relative to said attachment;
    and wherein said cushion is pivotably attached to said at least one supporting arm and includes a second locking mechanism configured to hold said cushion in a locked position relative to said at least one supporting arm, and a second release mechanism configured to release said cushion from the locked position, thereby allowing pivoting of said cushion relative to said at least one supporting arm.

2. The head rest of claim 1 wherein said second release mechanism is operatively engaged with said first release mechanism whereby said second release mechanism is activated by the pivoting motion of said at least one supporting arm.

3. The head rest of claim 1 wherein said second release mechanism is activated by the pivoting motion of said at least one supporting arm.

4. The head rest of claim 1 further comprising a maneuvering bar having a first end and a second end wherein said first end is pivotably connected to said attachment and pivots about a second pivoting axis located at a distance from said first pivoting axis, and wherein said second end is attached to said second release mechanism.

* * * * *